Patented Sept. 15, 1942　　　　　　　　　　　　　　　　　　2,295,924

UNITED STATES PATENT OFFICE 2,295,924

ALPHA SUBSTITUTED ALLYL ESTERS OF ACRYLIC ACID AND HOMOLOGUES

Carl E. Barnes, Worcester, Mass., assignor, by mesne assignments, to E. I. du Pont de Nemours & Company, Wilmington, Del., a corporation of Delaware No Drawing. Original application December 6, 1938, Serial No. 244,217. Divided and this application December 11, 1939, Serial No. 308,642. In Canada May 5, 1939

2 Claims. (Cl. 260—83)

This invention relates to polymerizable substances and co-polymers formed therefrom, and more particularly to the esters of substituted allyl alcohols and acrylic acid and methacrylic acid.

Various compounds containing an unsaturated methylene group, such as methyl methacrylate, are capable of polymerization by a rearrangement of the primary valence bonds in such a way as to form a linear chain having the group

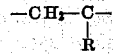

as a repeating unit (R being hydrogen, methyl, halogen etc.). These linear polymers ordinarily have the properties of fusibility and solubility and they are thus unsuited for many purposes where hardness and a high softening point are important characteristics. I may copolymerize such substances to form linear polymers with a cross linking agent which contains two polymerizable unsaturated methylene groups per molecule, such as ethylene glycol dimethacrylate. Both of these groups may cross link with the linear polymer chains and thus form a three dimentional structure which is infusible and insoluble.

In accordance with this invention, I propose to make as such cross linking agents, alpha substituted allyl esters of acrylic acid and methacrylic acid. The primary object of this invention is, therefore, to prepare such alpha substituted allyl esters of acrylic acid and methacrylic acid and to form polymerized bodies thereof. Further objects will be apparent in the following disclosure.

I, therefore, propose to make and to use as a polymerized substance an alpha substituted allyl ester of acrylic acid and methacrylic acid of the general formula:

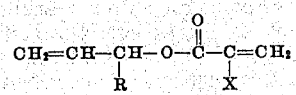

wherein X may be hydrogen or the methyl group, and wherein R may be an alkyl, aryl or alicyclic group, such as methyl, ethyl, propyl, butyl, allyl, cyclohexyl, phenyl, tolyl and other similar groups.

These substances may be prepared by the addition of the corresponding Grignard reagent to acrolein, followed by esterification of the resulting secondary alcohol with acrylic or alpha substituted acrylic acid. The nature of the Grignard reagent determines the alpha substituent, hence a great many derivatives may be made. The esterification of the secondary alcohol obtained may be carried out by different methods, but I prefer to employ acrylic or methacrylic anhydride as the esterification reagent. The steps are indicated by the following reactions where R is any alkyl, aryl or similar group, R' is hydrogen or methyl and X is any halogen, such as chlorine, bromine or iodine:

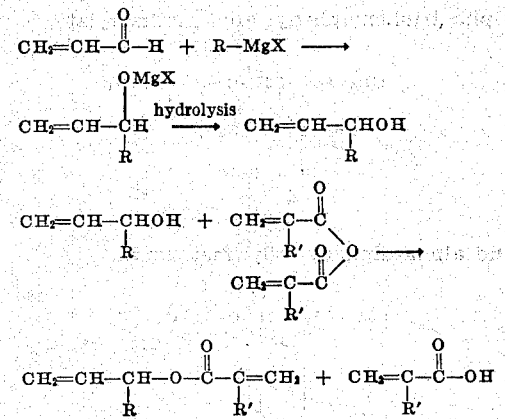

It is desirable to use a polymerization inhibitor, such as pyrogallol or copper methacrylate, during the esterification reaction, and it is desirable to use a base, such as pyridine to combine with the free acid liberated during the course of the esterification. These substances are removed by washing the product in water and/or by the subsequent distilling operation to separate and purify the product.

These substituted allyl esters are substantially transparent liquids and they polymerize to transparent solids which are infusible and insoluble.

In addition to the fact that these alpha alkyl, alicyclic and aryl substituted allyl esters of acrylic acid and methacrylic acid polymerize by themselves to form useful substances, they are also particularly effective as agents for modifying the properties of other polymerizable substances when copolymerized therewith. These esters serve as cross linking agents for various base substances which contain a single polymerizable unsaturated methylene group per molecule, and particularly with such substances as methyl methacrylate, vinyl acetate, styrene, methyl vinyl ketone and other substances.

The chosen alpha substituted allyl ester and the base substance may be so proportioned as to form a substantially infusible and insoluble body, or the proportions may be so selected that there is relatively little cross linking and the product will then have properties intermediate between that of the linear polymer and that of the highly cross-linked interpolymer. Similarly, the ingredients may be so proportioned as to prevent there being sufficient strain set up within the interpolymer to cause crazing or cracking and yet provide enough cross linking to produce a material of sufficiently high softening point or hardness characteristics that it may be shaped by a grinding operation, or may be otherwise serviceable in a given art, such as for making an optical body having increased scratch resistance, or a bonded abrasive article.

A feature of this invention is that I may make such alpha substituted allyl esters of acrylic or methacrylic acid which not only serve as cross linking agents by virtue of their two polymerizable unsaturated groups per molecule, but also contain as the substituent a group which raises the refractive index. Thus, I may use such compounds as alpha triphenylmethyl allyl methacrylate,

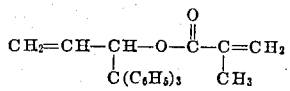

alpha triphenylphenyl allyl methacrylate,

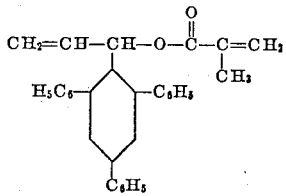

and alpha diphenyl allyl methacrylate,

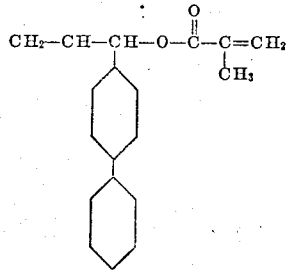

These compounds then serve not only as cross linking agents for various polymerizable substances, but also as refractive index modifying agents. For example, polymerized alpha triphenylmethyl allyl methacrylate has a refractive index of 1.65 and may be used to raise the refractive index of poly methyl methacrylate from its value of 1.49 as well as to harden this substance by cross linking. Hence, I may make a large range of optical bodies of the required indices of refraction and dispersion values which have not been heretofore available.

The alpha substituted allyl esters of acrylic and methacrylic acids may be also used as bonding agents for various granular materials and particularly for abrasive grains in the manufacture of grinding wheels and other abrasive products. In that case the proportion of the modifying agent employed will be governed by the requirement of the final product. If abrasive grains, such as crystalline alumina, silicon carbide, boron carbide or diamonds, are to be bonded by the interpolymer, the mixture of chosen monomeric substances may be incorporated with the grain in desired proportions and the bond polymerized by heat, with or without the aid of catalysts, such as benzoyl peroxide. Suitable procedure may be adopted for making such bonded articles in accordance with the methods set forth in the applications of Kistler and Barnes Serial No. 187,549 filed January 28, 1938, and Serial No. 228,004 filed September 1, 1938. For example, a grinding wheel may be made by placing a desired amount of the abrasive grains in a mold and then pouring into the mold a sufficient amount of the bond mixture to fill the interstices between the grains, after which the mold is subjected to heat for polymerizing the bond in place. Also, since the substance may be softened by heat materially, then one may polymerize the bond fully or partially and use it as a granular or powdered substance which may be mixed with the abrasive grains, together with a plasticizing medium, such as any suitable solvent which includes monomeric polymerizable liquids. Then the mixture of grains and bond may be shaped in a mold with sufficient heat and pressure to cause the bond to soften and adhere to the grains. The monomeric polymerizable plasticizer may be used in sufficient amount to wet the grains and be solidified by polymerization so that no liquid remains in the finished article. Other suitable procedures as set forth in my prior applications may be employed with the base substance and the modifying agent herein disclosed and this invention is deemed to cover the products thus made.

It will now be appreciated that one may make various shaped bodies for use in other industries, such as for electrical insulation, or for making molded articles of many uses. The monomeric liquid or liquids may be used in desired proportions and placed in a mold with or without catalysts and there subjected to heat or light to polymerize the mixture. If the copolymer is very hard it may be ground by standard grinding operations, such as are practiced in the industry for making an optical lens or other desired article. If the copolymer is fusible then it may be shaped under pressure within a suitable mold.

It will be understood that while I have attempted to explain this invention in the light of the present accepted theories yet the claims are not to be construed as dependent on any particular theory relative to the formation of these substances. Also, the examples above given are to be interpreted solely as illustrating the invention and not as limitations thereon, except as set forth in the claims appended hereto.

This case is a division of my copending application Serial No. 244,217 filed December 6, 1938.

I claim:

1. Alpha triphenyl phenyl substituted allyl methacrylate.

2. Polymerized alpha triphenyl phenyl substituted allyl methacrylate.

CARL E. BARNES.